US006129092A

United States Patent [19]

Mondl et al.

[11] Patent Number: 6,129,092

[45] Date of Patent: Oct. 10, 2000

[54] MOUSE CLEANING APPARATUS AND METHOD

[76] Inventors: John T. Mondl, 143 Hollinger Ave., Akron, Ohio 44302; Mark E. Esmile, 2116 Pinebrrok Trail, Cuyahoga Falls, Ohio 44223; Aubert Y. Coran, 1801 Brookwood Dr., Akron, Ohio 44313

[21] Appl. No.: 08/794,417

[22] Filed: Feb. 5, 1997

Related U.S. Application Data

[60] Provisional application No. 60/011,291, Feb. 7, 1996.

[51] Int. Cl.[7] ........................................ B08B 9/00

[52] U.S. Cl. .................................... 134/6; 134/8; 134/42; 15/104.93; 15/210.1; 15/244.1

[58] Field of Search ............................ 15/104.93, 104.94, 15/210.1, 244.1, 244.3, 244.4; 134/6, 8, 42

[56] References Cited

U.S. PATENT DOCUMENTS

| | | | |
|---|---|---|---|
| 714,626 | 11/1902 | Williams | 15/244.3 |
| 3,452,382 | 7/1969 | Kazdan | 15/104.93 |
| 5,548,862 | 8/1996 | Curtis | 15/244.3 X |

FOREIGN PATENT DOCUMENTS

| | | | |
|---|---|---|---|
| 473695 | 3/1929 | Germany | 15/244.4 |

*Primary Examiner*—Mark Spisich
*Attorney, Agent, or Firm*—Oldham & Oldham Co., L.P.A.

[57] ABSTRACT

An improved mouse cleaning apparatus having a cleaning ball for temporary insertion into the cavity formed on the underside of the mouse. In one embodiment, the cleaning ball includes a core which is encased within an outer shell of polymeric material such as a foamed rubber compound. This core may be metallic, polymeric, or made of another sufficiently dense material, and is provided to ensure that the cleaning ball is sufficiently heavy to properly roll in response to movement of the mouse across a mouse pad or the like. The core may alternatively be covered with absorbent fibers, which may be synthetic or organic in nature, rather than a polymeric coating. In another embodiment, the cleaning ball is made entirely of a polymeric or elastomeric material having sufficiently high weight and/or density or is sufficiently compressed such that a weighted core is not required. The apparatus further comprises a mouse cleaning pad to provide a suitable planar surface upon which to roll the mouse during cleaning operations. The upper surface of the mouse pad is preferably textured to provide a surface having a relatively high coefficient of friction for the cleaning ball. An improved cleaning method, and various methods for manufacturing mouse cleaning balls are also described.

20 Claims, 6 Drawing Sheets

40 44 46 18 46 46 19b 19a 46 46 14 10 12 46 46 46 7 7

40 44 42

50' 52

MOUSE CLEANING APPARATUS AND METHOD

Applicant claims priority from Provisional Application Ser. No. 60/011,291, filed Feb. 7, 1996 under 35 U.S.C. 119(e).

FIELD OF INVENTION

The present invention relates generally to an apparatus for cleaning a computer mouse, and more particularly to a cleaning ball for insertion into the cavity formed in the underside of a computer mouse, as a temporary replacement for the operational mouse ball, such that upon movement of the mouse across a surface, the cleaning ball, preferably in conjunction with a solvent, acts to clean the rollers located within the mouse cavity. The present invention also relates to an improved method for utilizing the mouse cleaning ball described herein to clean a computer mouse.

BACKGROUND OF THE INVENTION

In recent years, the use of computers has become increasingly popular. One reason for the increased popularity and usage of computers has been the graphical user interface (GUI) which allows a computer user to execute various computer commands by manipulating symbols and icons on the computer screen. Although most GUI's allow the computer user to utilize a standard keyboard to manipulate the graphical images on the screen to perform various functions, the computer "mouse" is the most common apparatus by which computer users interact with a computer through a GUI.

A computer equipped with a mouse will display a pointing symbol (ordinarily a small arrow) on the computer screen. The mouse is a pointing and selection device, connected to the computer through the use of a wired or wireless connection, that allows a computer user to move the pointing symbol to various locations on the computer screen in response to movement of the mouse across a surface such as a desktop or another substantially horizontal, planar surface. The computer user places the mouse on the flat surface and slides the mouse across the surface in any direction desired, thereby causing the pointing symbol to correspondingly move on the computer screen. Once the pointing symbol is located as desired on the screen, for example pointing at an icon that will cause a document to print, the user can press one or more buttons on the mouse to execute the particular operation indicated by the icon.

In general, the computer mouse consists of a body having a cavity formed in the underside thereof. The cavity is designed to accept a spherical mouse ball which is retained in the cavity by an annular retainer ring that allows a portion of the ball to extend from the lower side of the mouse. When the lower side of the mouse is placed on a planar surface such as a desktop or a specially designed mouse pad, the mouse ball engages the planar surface and is rotated within the cavity in response to movement of the mouse across the surface.

The cavity typically includes three rollers that engage the mouse ball. Two of the rollers are connected to transducers that translate the rotational movement of the mouse ball (in response to movement of the mouse across the planar surface), through the use of pulse encoders, into X-Y coordinate signals that are transmitted into the computer and control the position of the arrow pointing symbol on the computer display screen. The third roller is a tension roller, which may be spring-loaded, provided to ensure that the mouse ball remains in constant contact with the first and second rollers.

It can be seen that proper operation of the mouse device requires the mouse ball to be in constant contact with a suitable planar surface. Most mouse users utilize a mouse pad which is placed on a desktop, and includes a textured upper surface that has a sufficiently high coefficient of friction such that the mouse ball consistently rotates whenever the mouse is moved across the pad. The mouse pad also serves to isolate the mouse from dirty or dusty surfaces such as the user's desktop.

While such an arrangement will ordinarily work well for a while, over time, the mouse ball, the mouse cavity, and the rollers within the cavity inevitably become fouled with dirt, dust, and other foreign matter. For example, a mouse pad will collect dirt and oil from the hands of the computer user and will transfer the same to the mouse ball, and consequently to the rollers. Also, as the mouse ball becomes coated with dirt and oil, the ball will begin to retain lint and other foreign matter on the surface thereof, which ultimately gets transferred to the rollers. Cigarette smoke can also cause a mouse ball, cavity and rollers to become contaminated. Also, many computers are used in generally dusty and harsh environments where food particles, beverage spills, and other contaminants are frequently encountered.

The collection of dirt, oil, and other foreign matter on the mouse ball, in the mouse cavity, and on the mouse rollers, eventually causes a mouse to malfunction. Movement of the mouse across the planar surface will cause the mouse ball to rotate, but the foreign matter on the rollers will cause the mouse ball to slip against the rollers or otherwise fail to roll in response to movement of the mouse ball. This leads to inconsistent and erratic behavior of the pointing symbol displayed on the computer screen, and generally makes the computer more difficult to use.

A prior mouse cleaning apparatus has been developed wherein a mouse ball is covered with a first hook component of a two part Velcro® system and coated with a solvent. This ball is then temporarily inserted in to the mouse cavity. A mouse pad covered with the corresponding loop component of the Velcro® system is also provided. After the Velcro® covered ball is coated with a solvent and inserted into the mouse cavity, the mouse is operated on the Velcro® mouse pad, such that the hooks on the mouse ball, in conjunction with the solvent, dislodge and abrade debris from the rollers within the mouse cavity, and transfer the same to the Velcro® covered mouse pad surface. However, this apparatus has not been found to be effective in thoroughly cleaning the mouse rollers and cavity, because the spring-like action of the hook component covering the surface of the ball tends to spray the liberated dirt and debris throughout the inside of the mouse cavity. Most importantly, the Velcro® surface of the mouse ball is not sufficiently absorbent to retain a meaningful amount of solvent where it is needed—i.e., at the point of contact between the cleaning ball and the mouse rollers. It has been found that in order to properly clean the rollers within the mouse cavity, the rollers must be bathed and kept in contact with a suitable amount of solvent. A mouse ball covered in Velcro® does not absorb sufficient solvent to properly clean the rollers, and is not effective in properly bathing the rollers in solvent. Also, while the Velcro® covered ball and pad are provided as a means for transferring dirt and lint from the cleaning ball to the pad, the opposite can also occur, where the ball picks up lint and dirt from the pad and transfers the same back into the mouse cavity and onto the rollers. Also, the engagement of the hook and loop elements of the Velcro® make it difficult for the user of the mouse to perform the cleaning operation. The user must restrain the pad component in position with one hand, and use a relatively large amount of force with the other hand to move the mouse across the surface of the mouse pad. In addition, the Velcro® covered mouse cleaning ball has a tendency to become stuck within the mouse cavity, and may require the use of a removal pin or hook. The bristled surface of the cleaning ball sprays cleaning solvent and dirt throughout the mouse ball cavity, and this spraying of dirt and solvent is thought to aggravate rather than alleviate the dirty condition of the mouse. Finally, the bristled "hook" surface of the Velcro® covered cleaning ball does not maximize contact between the cleaning ball and the rollers.

SUMMARY OF THE INVENTION

The present invention is therefore directed to an improved mouse cleaning apparatus comprising a cleaning ball for temporary insertion into the cavity formed on the underside of the mouse. In a first preferred embodiment, The cleaning ball comprises a uniform construction of a foamed (open core) polymeric material. Another preferred embodiment utilizes a solid core surrounded by an outer thickness of foamed (open cell) material. The core may be metallic, polymeric, or made of another sufficiently dense material, and is provided to ensure that the cleaning ball is sufficiently heavy to properly roll in response to movement of the mouse across a mouse pad or the like. In an alternative embodiment, the core is enlarged and covered with absorbent fibers, which may be synthetic or organic in nature, rather than a polymeric coating. The apparatus further comprises a mouse cleaning pad to provide a suitable planar surface upon which to roll the mouse during cleaning operations. The upper surface of the mouse pad is preferably textured and absorbent to allow dissolved or liberated dirt to be removed from the cleaning ball and to provide a surface having a relatively high coefficient of friction for interface with the cleaning ball.

In operation, the retainer ring on the lower side of the mouse is removed, allowing the ordinary operational mouse ball to be removed from the mouse cavity. The cleaning pad is placed on a flat surface, and the cleaning ball is placed on the cleaning pad. The ball is coated with and absorbs a generous amount of a solvent, such as isopropyl alcohol, ammoniated detergents or the like, but less than would saturate the open-celled layer on the ball. The mouse is placed over the cleaning ball, such that the ball enters the mouse cavity. Without lifting the mouse, the mouse is moved or rolled across the cleaning pad in a random manner to in turn contact the rollers. When the solvent-containing absorbent surface of the cleaning ball is brought to bear against the rollers, the resulting pressure aids the surface of the ball in releasing solvent onto the rollers. The solvent serves to dissolve or free dirt or other build-up on the rollers. The solvent then serves as a vehicle for this dirt and build-up where it is then reabsorbed or otherwise adhered to open-celled surface of the ball and thus carried away from the rollers. As the cleaning ball is moved across the associated cleaning pad, much of the dirt-containing solvent is further transferred from the ball to the cleaning pad.

The mouse can then be lifted, leaving the mouse ball on the cleaning pad. The above steps can be repeated until a visual inspection of the rollers reveals the absence of dirt thereon. The mouse is then reassembled with its ordinary operational mouse ball.

DETAILED DESCRIPTION OF THE PREFERRED EMBODIMENT

Figure 1:
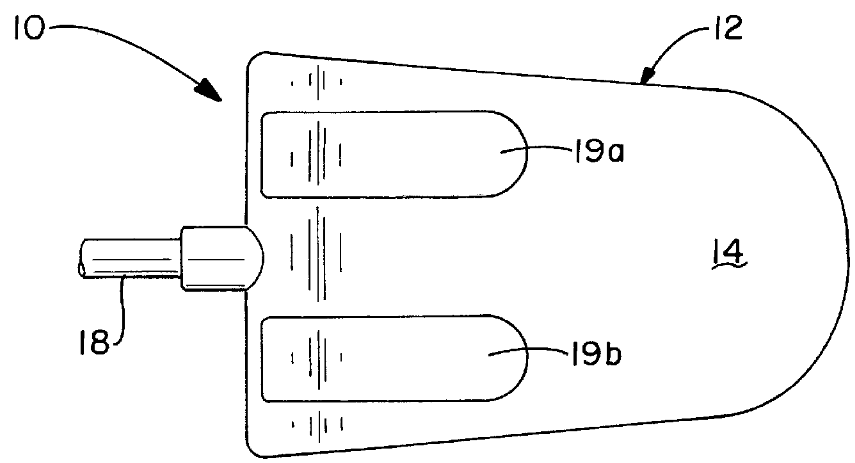
FIG. 1 is a top plan view of a computer mouse.
Figure 2:
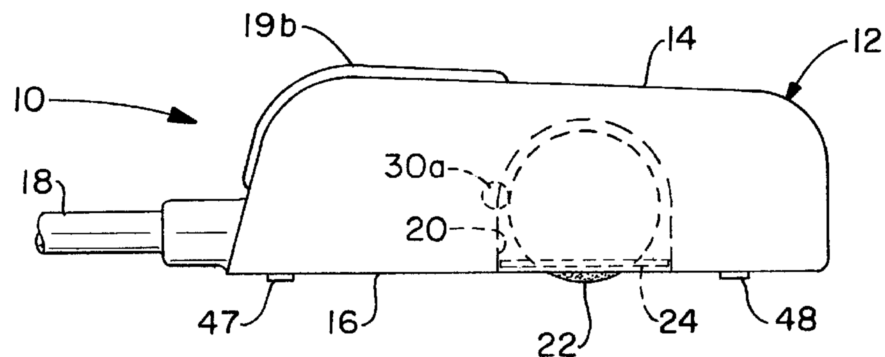
FIG. 2 is a side elevational view of a computer mouse.
Figure 3:
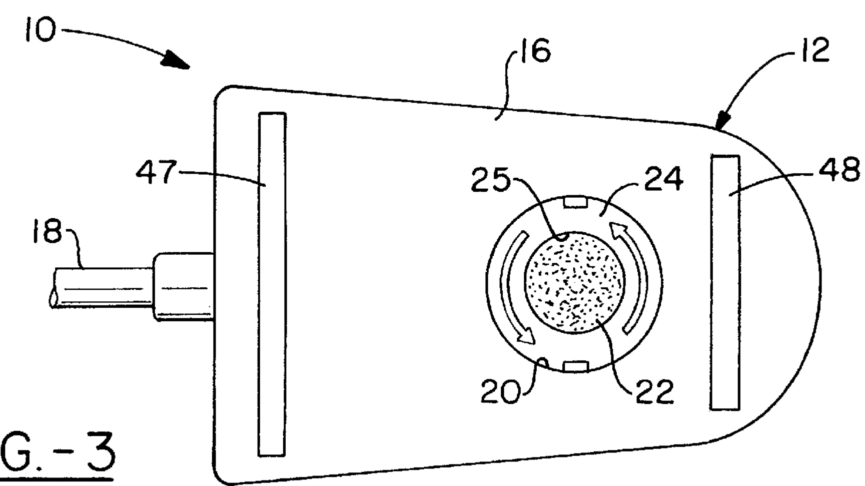
FIG. 3 is a bottom plan view of a computer mouse.

Reference will now be made in detail to the present preferred embodiments of the invention, examples of which are illustrated in the accompanying drawings. Wherever possible, the same reference numbers will be used throughout the drawings to refer to the same or like parts. A computer mouse is shown generally at 10 and includes a body 12 having an upper portion 14, and a lower surface 16. Computer mouse 10 includes a cavity 20 formed in the lower surface 16 thereof to contain an operational mouse ball 22. Mouse ball 22 fits relatively loosely within cavity 20 and is easily removable therefrom. Mouse ball 22 is typically retained with cavity 20 by a removable retaining ring 24 having an aperture 25 in the center thereof (FIG. 3). As is seen most clearly in FIG. 2 wherein the mouse is shown in its operational orientation, mouse ball 22 extends a short distance beyond lower surface 16 of mouse 10 through aperture 25 of retaining ring 24. In this manner, when mouse 10 is positioned on a horizontal support surface and slid thereon, mouse ball 22 will frictionally engage the horizontal support surface, and rotate within cavity 20 in response to movement of mouse 10 across the support surface.

Figure 5:
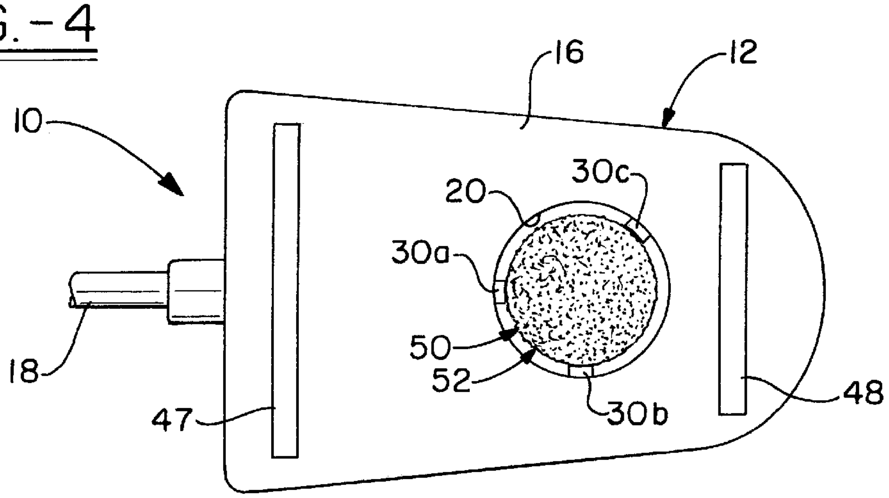
FIG. 5 is a bottom plan view of the computer mouse shown in FIG. 4, with a cleaning ball in accordance with the present invention inserted into the mouse cavity thereof.
Figure 6:
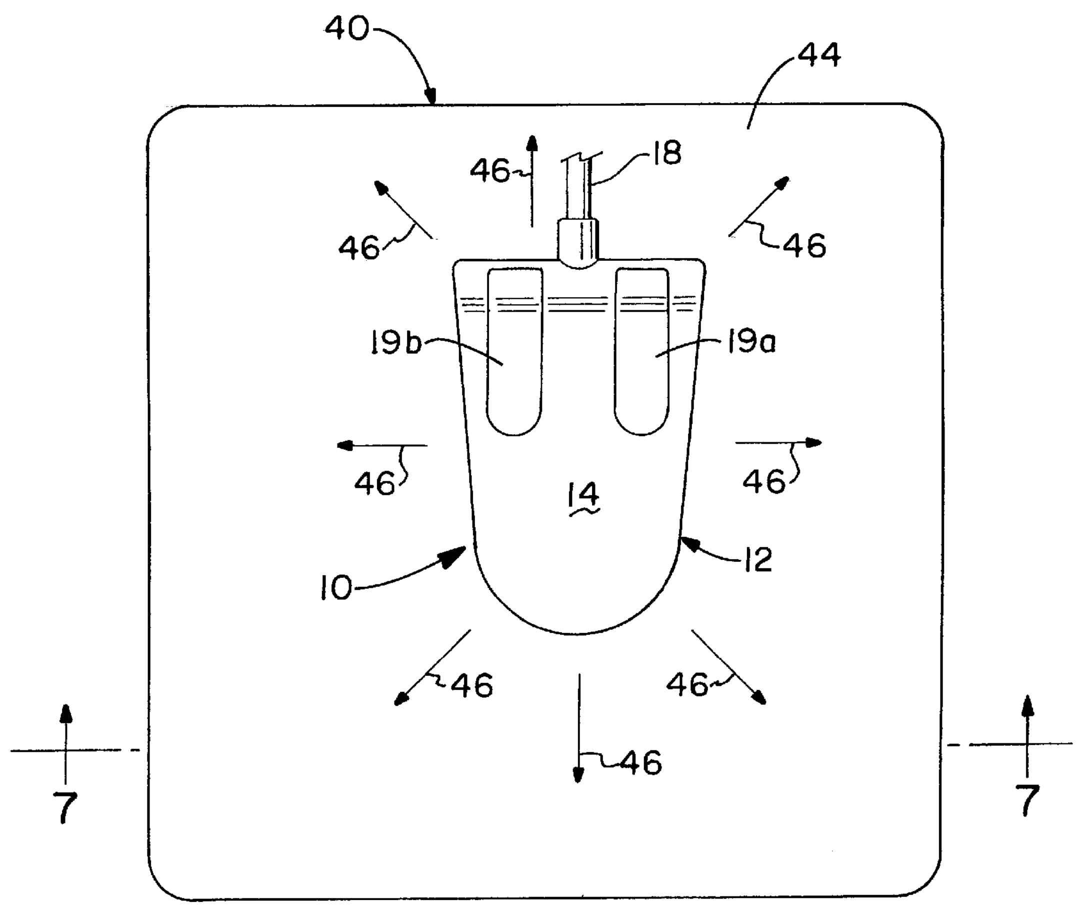
FIG. 6 is a top plan view showing a mouse pad in accordance with the present invention, and with a mouse to be cleaned placed thereon.
Figure 7:
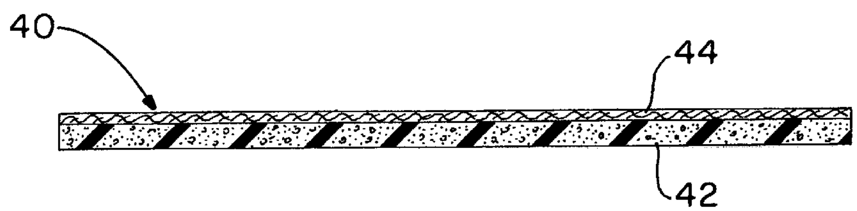
FIG. 7 is a view along line 7—7 of FIG. 6.

FIG. 6 shows a mouse 10 in its operational position with its lower surface 16 resting on a horizontal support surface provided by a cleaning pad 40. Referring also to FIG. 7, it can be seen that cleaning pad 40 includes a first layer 42 made from a foam rubber or other material or having a plurality of rubber feet or adhesives such that pad 40 frictional engages a surface such as a desktop or the like. Pad 40 also preferably includes a relatively smooth overlay surface 44 made from a fabric or the like adhered to first layer 42. Lower surface 16 of mouse 10 may be rested upon overlay surface 44 as is shown in FIG. 6, and mouse 10 may be slid across overlay surface 44 in any direction desired as is indicated by arrows 46. Although overlay surface 44 is generally relatively smooth relative to surface of first layer 42 of pad 40, overlay surface 44 has a sufficiently high coefficient of friction such that mouse ball 22 rotates within cavity 20 in response to sliding movement of mouse 10 across overlay surface 44. As is seen in FIGS. 2–5, lower surface 16 of mouse 10 preferably also includes first and second glide strips 47,48 made of Teflon or other material having a relatively low coefficient of friction, to facilitate the sliding movement of mouse 10 across overlay surface 44 of pad 40 as described. The sliding movement of mouse 10 across a support surface causes corresponding movement of a pointing symbol or the like which is displayed on a computer display device as is well known in the art of computers. Mouse 10 also includes first and second switches or buttons 19*a*, 19*b* which cause the computer to which mouse 10 is connected to execute certain operations, depending upon the location of the pointing symbol on the computer screen at the time the button is pressed by the user.

Figure 4:
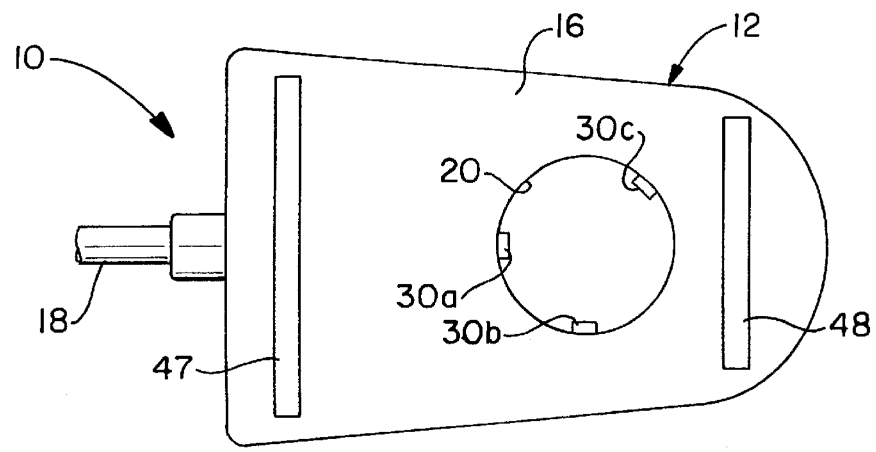
FIG. 4 is a bottom plan view of a computer mouse, with the retaining ring and operational mouse ball removed from the mouse cavity.

FIG. 4 shows a mouse 10 with the retaining ring 24 and mouse ball 22 removed therefrom. It can be seen therefore that mouse 10 typically includes first and second rollers 30*a*,30*b* which are connected to transducers such as pulse encoders that translate rotational movement of the mouse ball 22 within the cavity 20 into X-Y position signals or coordinates, that are communicated into the computer through connection wire 18 or a wireless connection. The pointing symbol displayed on the computer display device is caused to move in a manner corresponding to the movement of the mouse 10 across the mouse pad 40 in response to the X-Y position signals generated by rotation of rollers 30*a*, 30*b*. Typically, a third roller 30*c*, which may be spring-loaded, is provided as a tension roller to ensure that mouse ball 22 remains in contact with first and second rollers 30*a*,30*b* during mouse operations.

A mouse cleaning ball in accordance with the applicant's invention is illustrated in FIG. 5 at 50 as it is positioned within the mouse cavity 20 to clean the rollers 30*a*,30*b*,30*c*. It can be seen that mouse cleaning ball 50 preferably includes a textured absorbent outer surface 52 including numerous irregularities and depression for collecting and retaining a liquid cleaning solvent. Suitable cleaning solvents that may be utilized include isopropyl alcohol or ammoniated detergents, although any other suitable solvent may alternatively be used. Mouse cleaning ball 50 spherical and has an outer diameter that is the same, or slightly larger than an ordinary operational mouse ball. A mouse ball having an outer diameter that is too large will have a tendency to bind within the mouse cavity during cleaning operations and resist rotation upon sliding movement of the mouse during cleaning operations. Also, a mouse ball having a diameter that is too large will become lodged within the mouse cavity and will be difficult to remove therefrom upon the completion of the mouse cleaning operation. On the other hand, a mouse cleaning ball having an outer diameter that is too small will not sufficiently contact each of the rollers 30*a*,30*b*,30*c* within the mouse cavity 20, and therefore, the outer surface of the mouse cleaning ball will be unable to properly rub or "squeegie" the rollers 30*a*,30*b*, 30*c*. Also, it has been found to be very important for effective cleaning of a computer mouse is to maximize the amount of solvent in contact with each roller 30*a*,30*b*,30*c*. A mouse cleaning ball that has a diameter that is too small will not effectively communicate solvent to each of the rollers 30*a*,30*b*,30*c*. As is seen in FIG. 5, the outer surface 52 of a mouse cleaning ball 50 in accordance with the present invention is maintained in contact with each roller 30*a*,30*b*,30*c*.

Figures 8A, 8B, 8C:
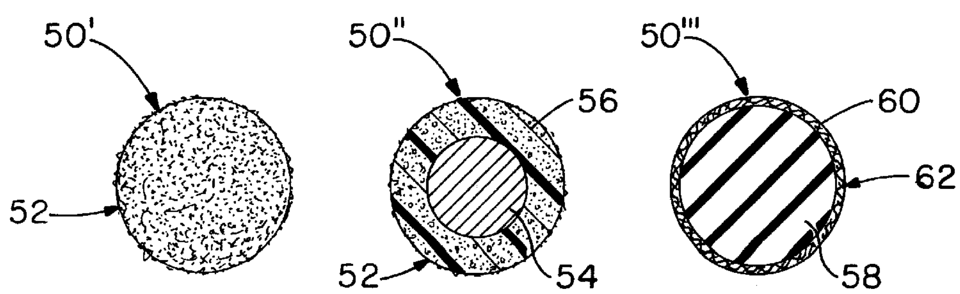
FIGS. 8A–8C are enlarged cross-sectional views showing mouse cleaning balls in accordance with the present invention.

The specific construction of mouse cleaning balls in accordance with the present invention are shown in FIGS. 8A–8C, wherein mouse cleaning balls 50', 50", 50'" are respectively shown. Each mouse ball 50', 50", and 50'" includes an outer surface 52 made from an absorbent material, and each has sufficient weight to frictionally engage the mouse pad 40 and roll within cavity 20 in response to movement of mouse 10 across the upper surface 44 thereof as described.

Mouse ball 50' is made of a polymeric or elastomeric material having sufficiently high weight and/or density or is sufficiently compressed such that a weighted core is not required to give mouse ball 50' sufficient weight. For example, mouse cleaning ball 50' may be made from a natural or synthetic rubber-based compounds, which is preferably foamed to provide mouse cleaning ball 50' with a porosity that allows solvent to be absorbed and retained thereby. The foamed rubber construction also provides a mouse cleaning ball having a textured outer surface 52 such that the rollers 30*a*,30*b*,30*c* are cleaned thereby. It should be recognized that the combination of an absorbent mouse cleaning ball with a textured outer surface 52 will result in the rollers 30*a*,30*b*,30*c* being treated with solvent as the outer surface 52 of the mouse cleaning ball moves against the rollers 30*a*,30*b*,30*c*. Further, the textured nature of surface 52 allows the dirt to be removed from the rollers once it is dissolved by or suspended in the solvent.

FIG. 8B shows an alternative embodiment of a cleaning ball in accordance with the present invention at 50" wherein ball 50" is constructed of a core 54 encapsulated in and surrounded by an absorptive layer of polymeric material. Core 54 may take a variety of forms and may be constructed of a metal such as steel, a nonmetallic substance such as a polymer or any other sufficiently dense material to provide weight to the cleaning ball 50". Utilization of a relatively dense core 54 allows a wider variety of polymers to be utilized to construct layer 56, because, the density of the polymer is less critical. For example, foamed rubber or a urethane sponge coating are suitable materials that may be utilized to construct layer 56. Layer 56 of mouse cleaning ball 50" is absorbent such that cleaning ball 50" retains a sufficient amount of solvent to effectively treat the rollers 30*a*,30*b*,30*c*. Outer surface 52 of layer 56 also is textured to provide a degree of mechanical cleaning action upon rollers 30*a*,30*b*,30*c* as well as reabsorbing the dirt-containing solvent onto its outer layer. One suitable method of manufacturing a mouse cleaning ball 50" involves utilizing a solid core 54, and encapsulating the same within the layer 56 of polymeric material through an injection, compression or similar molding process.

A further alternative embodiment of a mouse cleaning ball in accordance with the present invention is shown in FIG. 8C and comprises a spherical ball or enlarged core 58 having a thin layer 60 of absorbent fabric or fibers secured thereto with an adhesive, or by sewing. Layer 60 of fibers is manufactured from absorbent fibers which may be synthetic or organic. For example, suitable fibers that may be utilized are cotton, wool, rayon, nylon, and acetate. Core 58 may be manufactured from any suitable polymer or rubber based compound. The fibers within layer 60 may be randomly oriented or may be directed uniformly to provide a mouse cleaning ball 50'" with an outer surface 62 that will mechanically clean the rollers 30*a*,30*b*,30*c*. For example, the fibers may be oriented to project or extend radially outward from the core 58. The absorbency of the fibers will act to ensure that the rollers are treated with a sufficient amount of cleaning solvent.

The mouse cleaning pad described above in relation to FIG. 7 also forms part of the mouse cleaning apparatus of the present invention. It is preferable to utilize a mouse cleaning pad, rather than the ordinary operational mouse pad, such that the cleaning solvent and the dirt removed from the mouse do not stain the ordinary mouse pad. The lower surface 42 may be made from a foamed rubber such that it frictionally engages a surface such as a desktop. The upper overlay surface 44 of the mouse cleaning pad may be made from a wide variety of materials, although it is thought preferable to utilize the same material as is provided on the outer surface 52 of the mouse cleaning ball or a similar material. For example, the mouse cleaning ball shown in FIG. 8C may be provided with a layer 60 of cotton fibers, and in that instance, it would be preferable to provide a mouse cleaning pad having an upper surface of cotton fibers or some suitable material composed of woven fibers.

To clean a computer mouse 10 with the mouse ball 50 and pad 40 of the present invention after the operational mouse ball has been removed from the cavity 20, the cleaning pad 40 is laid on a flat surface such as a desktop with the upper surface 44 exposed. The mouse cleaning ball 50 is placed on the mouse cleaning pad 40, and a generous amount of cleaning solvent is applied thereto. Without picking the mouse ball 50 up off of the cleaning pad 40, the mouse 10 is then laid on top of the cleaning ball 50 such that the cleaning ball enters the cavity 20 formed in the underside 16 of the mouse 10. The mouse 10 is then slid across the upper surface 44 of the cleaning pad 40 in a random fashion. In this manner, the rollers 30a,30b,30c within the mouse cavity are contacted by the mouse cleaning ball 50, and also surface 52 of cleaning ball deposits cleaning solvent on rollers 30a, 30b,30c to loosen or dissolve the dirt thereon. When the solvent-containing absorbent surface of the cleaning ball 50 is brought to bear against the rollers, the resulting pressure aids the surface of the ball in releasing solvent onto the rollers. The solvent serves to dissolve or free dirt or other build-up on the rollers. The solvent then serves as a vehicle for this dirt and build-up where it is then reabsorbed or otherwise adhered to open-celled surface of the ball and thus carried away from the rollers. As the cleaning ball 50 is moved across the associated cleaning pad 40, much of the dirt-containing solvent is further transferred from the ball to the cleaning pad 40. The mouse may then be lifted, leaving the mouse cleaning ball 50 behind on the cleaning pad 40. The rollers 30a,30b,30c may then be visually inspected and, if necessary, the above steps may be repeated until the rollers 30a,30b,30c, are clean.

EXAMPLES

The foregoing may be more clearly understood with reference to the following examples of specific mouse cleaning ball 50 constructions:

Example I

Fabric-covered rubber ball process—In this case, first a rubber ball 58 (FIGS. 8C and 10) is molded, e.g., from a natural rubber (NR). An example recipe is a follows:

TABLE I

| | |
|---|---|
| NR | 100 |
| Carbon Black (GPF) | 30 |
| Clay | 30 |
| Zinc Oxide | 9 |
| Sulfur | 3.5 |
| DPG Accelerator | 2.0 |
| Santocure ® Accelerator | 1.0 |

Figure 9:
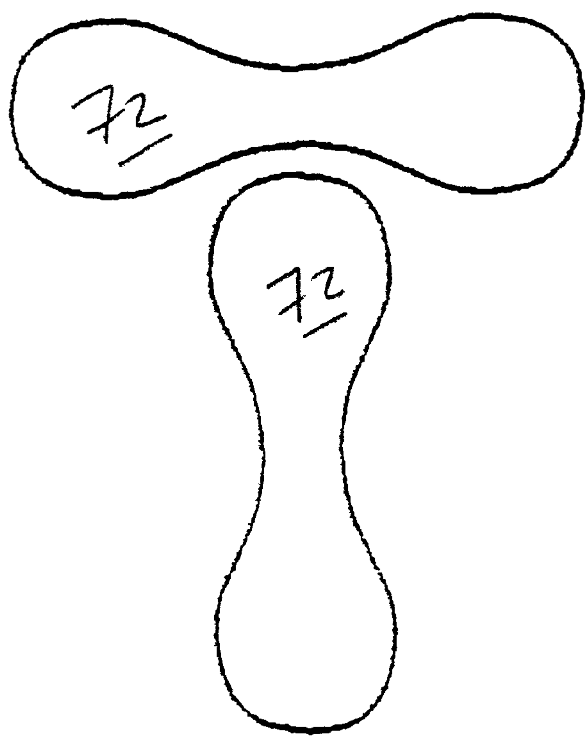
FIG. 9 is a top plan view of pieces of fabric used to construct a mouse cleaning ball in accordance with the present invention.
Figure 10:
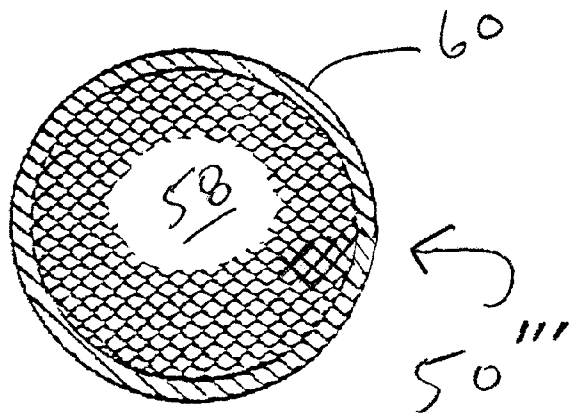
FIG. 10 is a cross-sectional view of a mouse cleaning ball constructed in accordance with the present invention.

The ball 58 is only partially cured during this (first) molding step of the process. The molded ball 58 is then coated with a cement of curable NR. The cement is a mixture of rubber, dissolved in a solvent (e.g., in toluene), and curatives, etc., similar to the above recipe, but without the carbon black. As is shown in FIGS. 9 and 10, the ball 58 is then covered with two dumbbell-shaped pieces of a melton-type fabric 72 (FIG. 9) to form a fabric cover 60 substantially covering the surface of ball 50. The type of fabric cover used in tennis balls is suggested (i.e., a 50–65% wool 35–50% nylon weft woven into a light cotton warp, cotton comprising about 15% of the total fabric). The fabric is coated on one side with a vulcanizable latex, dried, then cut into pieces 72 of the type shown in FIG. 9.

After the pieces of fabric 72 are cut from the coated fabric, their edges are coated with the vulcanizable latex and let dry. The latex-coated faces of the pieces of fabric 72 are then mated to the coated ball 58 by hand or with the aid of a machine. Because the pieces 72 are cut from the fabric with it's axis oriented 45° from the fabric direction, it can "pantograph" to conform to the spherical surface of the cement coated ball 58.

After the pieces of fabric 72 are adhered to the ball 58 by tack bonding, the ball 50''' is placed into a mold, which is somewhat larger than the first one. The built-up structure is then cured in it's final configuration as shown in FIG. 10. The first molding (by compression molding) is done for about two minutes at 150° C. The second curing is done for about fifteen minutes, again at 150° C. This method provides good control of the final diameter which results in good cleaning of the mouse rollers 30a–30c .

There are other options for the fabric, e.g., pile fabrics (so-called artificial furs), which are made by the same principle as some carpet fabrics. An open, square-woven fabric is filled with lopes of yarn which are cut on one side of the fabric. The other side (the back side) is coated with latex or other adhesive material. This same adhesive material could be used to adhere the dumbbell-shaped pieces 72 to the surface of the ball 58. An advantage of such a fabric is that all of the fibers would protrude from the surface as a dense nap, with essentially all of the protruding fibers having the same length.

Example II

Figure 11:
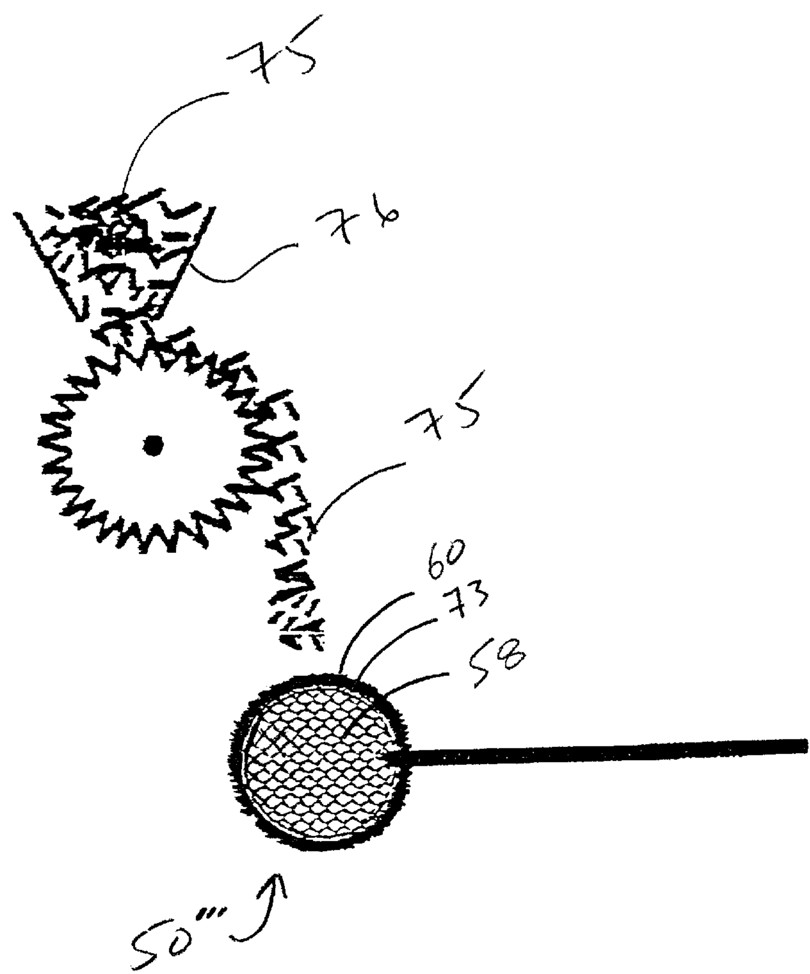
FIG. 11 schematically illustrates a method of manufacturing a mouse cleaning ball in accordance with the present invention.

Electrostatic deposition process.—In this process, the core all 58 can be injected molded from any number of polymers. These include rubber, polyolefins, polystyrene, ABS, and nylon. Alternately, the ball 58 can be made from another type of material e.g., wood, metal, or ceramic. The ball 58 is then mounted on a metal support shaft which can be electrostatically charged positive as is shown in FIG. 11. The fibers 75 are deposited from a negatively charged device such as hopper 76 for feeding the fibers 75 over the ball 58 which is suitably rotated or otherwise manipulated to ensure an even coating of fibers 75. (Fiber transport could be aided by moving air.) The ball 58 is either coated with an adhesive 73 or, in some cases, the surface of the uncovered ball can be heated to a melt which can act as an adhesive, or, alternately it could be treated with a solvent for the polymer from which it has been prepared. With the adhesive or the polymer surface 73 in the tacky state, the fibers 75 are deposited, and then the adhesive is set by time, heat, or solvent evaporation to form the absorbent outer surface 60.

Examples of fibers 75 (e.g., used in the form of chopped yarn) are: cellulose (cotton, flax, ramie, wood (paper), etc.), rayon (e.g., Avisco®, Avril®, Enka®, Fiber 700®, Rayflex®, Tyrex®, Tyron®, etc.), cellulose acetate (e.g., Acel®, Avisco®, Estron®, etc.), Nylon 6 (e.g., Caprolan®, Enka®, Pearlon®, etc.), Nylon 6—6, (e.g., Antron®, Cantrece®, etc.), and acrylic (e.g., Acrylan®, Courtelle®, Dralon®, Orlon®, Zefran®, etc.). Examples of adhesives are: rubber cement, phenolic, vinyl acetate, acrylic, hot melt (e.g., based on olefin polymers, polyamides, or polyesters), polyurethanes, and epoxy.

A modification of this process is the use of simply gravity feed (no electrical charge) of an excess of the fibers 75 to the sticky surface of the ball 58. Again, the fiber transport can be aided by dispersion in flowing air. The fibers 75 that drop past the ball 58 must be recycled. A variation of this process is to have the fibers 75, entrained in flowing air, be transported upwards toward the surface of the ball 58. A disadvantage to the non-charged deposition is that the orientation of the fibers 75 is more or less random; whereas, in the case of the electrostatic deposition, the fibers 75 are essentially all radially oriented. However, since the fibers are mutually repulsive, in their orientation just before deposition, uneven patterns of deposition can result.

Preferred fibers are those of cotton, rayon, and nylon. This is because they would be readily wetted by the cleaning solvent, i.e., isopropanol. Nylon fibers could be advantageously employed because they could be made to adhere to a nylon core ball whose surface is molten or solvent-tackified at the time of the application of the nylon fibers by electrostatic means, gravity flow, or air-entrained flow. One might use nylon 6—6 fibers on a molten-surface nylon 6 ball. The nylon 6—6 has a higher melting point than does nylon 6. Thus the fibers would not severely thermally deform upon contacting the molten nylon 6 surface, provided the temperature of the molten surface would not exceed the melting point of the nylon 6—6 fibers.

Example III

Open-cell sponge process—In this process, rubber-ball cores 54 (FIG. 8B) are prepared by compression molding e.g., from SBR or NR. Cores 54 are placed in molds, each large enough to contain the core 54 and an open-cell foam cover layer 56. The core ball 54, which may alternatively be metallic or made from any other suitable material, is centered in the cavity by 4 locating pins. A foaming compound is injected into the mold, around the core 54.

An example of a recipe for such a foam cover is as follows:

TABLE III

| | |
|---|---|
| Styrene-butadiene Rubber (SBR) | 100 |
| Hy-styrene (SBR) | 25 |
| Zinc Oxide | 6 |
| Whiting | 200 |
| Naphthenic Oil | 95 |
| Sulfur | 4 |
| Methyl Tuads Accelerator | 2.5 |
| Antioxidant (Wingatay L) | 1.0 |
| Micronized Baking Soda | 18 |
| Methyl Zimate | 0.15 |

The foaming conditions will, in a large part, determine the thickness of the foam 56 after expansion when the mold is opened and because of the fast action of the blowing agent (NaHCO3), the curing system must be fast and without delay. A mouse cleaning ball 50" thus formed has been found to be very effective in absorbing a sufficient amount of cleaning solvent and communicating the same to the surface of the dirty rollers without spraying the inside of the mouse cavity with dirt and solvent. Such a cleaning ball 50" is very effective in maintaining the rollers 30*a*–30*c* in continuous contact with the solvent retained on the outer surface 52 of the ball 50".

Those skilled in the art will recognize that the foregoing description has set forth the preferred embodiment of the invention in particular detail and it must be understood that numerous modifications, substitutions and changes can be undertaken without departing from the true spirit and scope of the present invention as defined by the ensuing claims.

What is claimed is:

1. A method of cleaning the rollers within a cavity formed in the underside of a computer mouse, said method comprising the steps of:

removing an operational mouse ball from said computer mouse;

providing a mouse cleaning pad on a flat surface, said mouse cleaning pad comprising a lower surface and an upper absorbent and textured overlay surface covering a substantial portion of said lower surface;

providing a spherical mouse cleaning ball comprising an absorbaet foamed polymeric outer surface;

placing said mouse cleaning ball on said mouse cleaning pad;

applying a cleaning solvent to said mouse cleaning ball such that said ball absorbs said cleaning solvent;

without lifting said mouse cleaning ball, placing said computer mouse on top of said mouse cleaning ball such that said cleaning ball is positioned within said cavity formed in said underside of said mouse when said underside of said mouse is adjacent to said upper overlay surface of said mouse cleaning pad;

moving said computer mouse across said upper overlay surface of said mouse cleaning pad;

lifting said computer mouse away from said mouse cleaning pad, thereby leaving said mouse cleaning ball on said mouse cleaning pad; and, replacing said operational mouse ball within said mouse cavity.

2. An apparatus for cleaning the rollers within the cavity formed in the underside of a computer mouse, said apparatus comprising, in combination:

a spherical mouse cleaning ball for insertion into said cavity, said ball including an outer surface comprised of a material selected from the group consisting of foamed polymers, organic fibers and synthetic fibers which can absorb and retain a quantity of cleaning solvent, and wherein said outer surface of said ball contacts said rollers within said cavity, and a mouse cleaning pad comprising a lower surface and an upper absorbent and textured overlay surface covering at least a substantial portion of said lower surface, whereby said mouse cleaning ball treats said rollers within said cavity with said absorbed solvent, so that said mouse cleaning ball and said solvent receive foreign matter from said rollers and transfer said foreign matter to said mouse cleaning pad with substantailly no mechanical engagement between said mouse cleaning ball and said mouse cleaning pad.

3. An apparatus as recited in claim 2, wherein said outer surface of said mouse cleaning ball is a polymeric layer having open cells for absorbing and retaining said solvent.

4. An apparatus as recited in claim 3, wherein said polymeric layer is a foamed polymer.

5. An apparatus as recited in claim 4, wherein said mouse cleaning ball further comprises a centrally located core to provide weight to said mouse cleaning ball.

6. An apparatus as recited in claim 5, wherein said core is solid.

7. An apparatus as recited in claim 5, wherein said core is metallic.

8. An apparatus as recited in claim 3, wherein said polymeric layer is selected from the group consisting of rubber and polyurethane.

9. An apparatus as recited in claim 3, wherein said mouse cleaning ball is a polymeric ball having a textured outer surface.

10. An apparatus as recited in claim 9, wherein said polymeric ball comprises foamed rubber.

11. An apparatus as recited in claim 9, wherein said polymer is selected from the group consisting of rubber and polyurethane.

12. An apparatus as recited in claim 2, wherein said mouse cleaning ball comprises an enlarged core, wherein said outer surface of said mouse cleaning ball is provided by a layer of fibers selected from the group consisting of organic fibers and synthetic fibers secured to said enlarged core.

13. An apparatus as recited in claim 12, wherein said layer of fibers is adhesively secured to said enlarged core of said mouse cleaning ball.

14. An apparatus as recited in claim 12, wherein said layer of fibers is sewn to said enlarged core of said mouse cleaning ball.

15. An appartus as recited in claim 12, wherein said layer of fibers selected from the group consisting of cotton, wool, rayon, nylon and acetate.

16. An apparatus as recited in claim 15, wherein said fibers are oriented to project radially outward from said enlarged core.

17. An apparatus as recited in claim 2, wherein the overlay surface of said mouse cleaning pad is planar.

18. An apparatus as recited in claim 17, wherein the overlay surface of said mouse cleaning pad is relatively smooth.

19. An apparatus as recited in claim 2, wherein said lower surface is adapted to frictionally engage a rigid supporting surface.

20. An apparatus as recited in claim 2, wherein the outer surface of the mouse cleaning ball and the overlay surface of the mouse cleaning pad are made of the same material.

* * * * *